United States Patent [19]

Copperi et al.

[11] Patent Number: 4,811,398

[45] Date of Patent: Mar. 7, 1989

[54] METHOD OF AND DEVICE FOR SPEECH SIGNAL CODING AND DECODING BY SUBBAND ANALYSIS AND VECTOR QUANTIZATION WITH DYNAMIC BIT ALLOCATION

[75] Inventors: Maurizio Copperi, Venaria; Daniele Sereno, Torino, both of Italy

[73] Assignee: CSELT-Centro Studi e Laboratori Telecomunicazioni S.p.A., Torino, Italy

[21] Appl. No.: 934,302

[22] Filed: Nov. 24, 1986

[30] Foreign Application Priority Data

Dec. 17, 1985 [IT] Italy ................... 68060 A/85

[51] Int. Cl.$^4$ .............................................. G10L 7/02
[52] U.S. Cl. ...................................... 381/37; 381/36; 381/40; 381/47; 375/26
[58] Field of Search .................. 381/31, 36, 37, 40, 381/41, 43, 47; 375/37, 25, 26

[56] References Cited

U.S. PATENT DOCUMENTS

| 4,672,670 | 6/1987 | Wang et al. | 381/47 |
| 4,680,797 | 7/1987 | Benke | 381/41 |
| 4,716,592 | 12/1987 | Ozawa et al. | 381/40 |
| 4,724,535 | 2/1988 | Ono | 381/31 |

OTHER PUBLICATIONS

Fully Vector-Quantized Subband Coding with Adaptive Codebook Allocation ICASSP 84, vol. 1 of 3, 107.1-107.4, Gersho et al.
The Design of a 16 KB/S Split-Band Adaptive Predictive Coder for Noisy Channels, Cheung et al., ICASSP 81, 631-635, 1981.
A Multirate Voice Digitizer Based Upon Vector Quantization, pp. 721-727, Guillermo Rebolledo, et al., IEEE Transactions on Communications, vol. Com-30, No. 4, Apr. 1982.
A New Dynamic Bit Allocation Scheme for Sub-Band Coding, vol. 4 of 4, ICASSP 85 43.2.1-43.2.4, Hamel et al.

*Primary Examiner*—William M. Shoop, Jr.
*Assistant Examiner*—Brian Young
*Attorney, Agent, or Firm*—Herbert Dubno

[57] ABSTRACT

According to the coding method, the digital speech signal is split into subbands; each subband is coded independently of the others. The first two subbands undergo an adaptive linear prediction operation yielding a residual, normalized with respect to a quantized r.m.s. value; the residual samples are quantized and coded by a variable bit number. As to the third subband the samples normalized with respect to a quantized gain term are directly quantized and coded by a variable bit number. While splitting the subband signals into sample blocks, for the first two subbands the coefficient vectors of subband linear prediction filters relevant to each block are also determined by vector quantization and linear prediction inverse filtering operations; quantized r.m.s. values are also determined to calculate the numbers of bits permitting subband signals coding. The coded signal consists of subband signal quantization level indices, of r.m.s. value quantization level indices, and of linear prediction filter coefficient vector indices.

15 Claims, 3 Drawing Sheets

METHOD OF AND DEVICE FOR SPEECH SIGNAL CODING AND DECODING BY SUBBAND ANALYSIS AND VECTOR QUANTIZATION WITH DYNAMIC BIT ALLOCATION

FIELD OF THE INVENTION

The present invention concerns adaptive-predictive speech-signal coding systems, and more particularly, a method of and a device for speech signal coding and decoding by subband analysis and vector quantization with dynamic bit allocation.

BACKGROUND OF THE INVENTION

While implementing speech signal coding systems for medium bit-rate transmission (e.g. 16kbit/s), the main problem to resolve is that of the quality of representation of the signal by exploiting the entire body of knowledge of production and perception speech-signal models, maximizing reproduction quality versus the desired bit rate.

From that point of view the systems which analyze total-band speech signal do not optimally exploit its characteristics, since the spectrum is non-uniform, i.e. its characteristics are considerably different as a function of the frequency region considered.

Then, by previously splitting the speech signal spectrum into independently-analyzed subbands, a piecewise approximation is obtained; i.e. a more accurate shaping of the full spectrum, rendering the coding method more flexible and efficient.

A speech-signal coding system by a band splitting is described in the paper by R. S. Cheung, S. Y. Kwon: "The design of a 16kbit/s split-band adaptive predictive coder for noisy channels", Proceedings of International Conference on Acoustics, Speech and Signal Processing, Atlanta, 1981, pp. 631-635.

According to this method the speech signal is split into two subbands.

Each subband is quantized by using a method of adaptive linear prediction and dynamic bit allocation which also calculates additional parameters such as spectral parameters which are scalarly quantized. The sampling frequency used is 6.4 kHz.

The splitting into two subbands is insufficient to approximate the signal spectrum to the degree desired. More particularly, subband quantizer determinations are hardly accurate and flexible, and a dynamic bit allocation over two subbands renders it difficult to follow with sufficient accuracy energy variations inside the spectrum.

Besides, the scalar quantization of spectral parameters entails the transmission of a considerable number of bits devoted to additional information, with consequent reduction in the availability of bits devoted to subband quantization; it furthermore reduces acoustic background noise immunity, since spectral parameters are calculated on the input-signal spectrum which can be noise-affected. The noise alters also quantized parameters. In addition, the use of predictive algorithms for higher speech-band frequencies is of limited efficiency owing to the scanty correlation existing between said subband samples. Finally, the used sampling frequency entails the additional insertion of apparatus to allow interfacing with standard transmission devices, e.g. on a telephone network operating at 8 kHz frequency.

SUMMARY OF THE INVENTION

These problems are resolved by the present invention of a speech-signal coding method providing voice-band splitting into 4 subbands; this splitting has been found to be the best compromise between speech-spectrum approximation, optimal dynamic bit allocation exploitation, and computing complexity.

The first two subbands (frequencies up to 2 kHz) are quantized by an adaptive linear predictive (ALP) method whose spectral parameters are vectorially quantized. In this way the number of coding bits devoted to said parameters is considerably reduced, thus allowing an increase in those devoted to subband quantization; in addition, noise-immunity is increased, since spectral parameters are selected from a parameter-vectors codebook determined under conditions of nearly-total noise absence.

The third subband (frequencies ranging between 2 and 3 kHz) is quantized with a non-predictive method, thus avoiding useless computations, owing to the scanty correlation existing between said subband samples.

In a preferred embodiment of the method, to be applied e.g. in transmission systems (such as telephone transmission) in which the bit-rate is medium-low, and the number of bits to be transmitted is to be reduced as much as possible, the fourth subband (frequencies beyond 3 khz) is not considered during the coding process. This technique is employed because the sound energy contribution at these frequencies is extremely low and the exclusion of this subband entails just a slight quality degradation of the reproduced speech-signal, to the great advantage of a reduction of calculations to be executed and an increase in the number of coding bits available for the other subbands, the bit rates being equal.

In an alternative embodiment of the method, to reproduce the speech signal in each frequency component, the fourth subband is subjected to a coding similar to that of the third subband.

The sampling frequency used is 8 kHz, a frequency which permits an easy interfacing of the coding device with standard devices of telephone-transmission on voice band channels.

The preferred embodiment of the coding and decoding method provided by the invention will be now described.

The coding method can be subdivided into three main steps as follows:

(A) subband splitting of the speech signal converted into a digital form;

(B) calculation of parameters to be used in the subsequent quantization step;

(C) independent quantization of each subband with dynamic bit allocation. The coding bit number is different for each subband and is periodically updated.

Each of said main steps will be hereinafter described, with reference to an application of the invention to a low bit-rate transmission system:

(A) The speech signal converted into digital is filtered by a bank of FIR (Finite Impulse Response) digital filters of the QMF (Quadrature Mirror Filter) type according to known techniques described e.g. in the paper by C. R. Galand, H. J. Nussbanner "New Quadrature Mirror Filter Structures" IEEE Transactions on Acoustics, Speech and Signal Processing, Vol. ASSP-32, No. 3, pp. 522-531, June 1984.

The bank of filters has a tree structure composed of pairs of cascaded filters, wherein the filters of the pairs have specular transfer functions with respect to transition frequencies.

By this filtering the digital speech signal is split into four equal-width subbands, hereinafter denoted $X_1$, $X_2$, $X_3$, $X_4$ with an increasing frequency order.

Considering in a nonlimiting example a speech signal band ranging between 0 and 4 kHz, the following subdivision will be obtained for the bands; $X_1=0$ to 1 kHz; $X_2=1$ to 2 kHz; $X_3=2$ to 3 kHz; $X_4=3$ to 4 kHz.

(B) The digital samples of subband $X_1$ are split into blocks $X_1(j)$, where j is the index of a sample in the block ($1 \leq j \leq J$).

The blocks of digital samples X(j) are then filtered in known manner using linear prediction inverse filtering, i.e. LPC inverse filtering, the transfer function H(z), in the Z transform, being in a non-limiting example:

$$H(z) = \sum_{i=0}^{L} a_1(i) \cdot z^{-i} = 1 + \sum_{i=1}^{L} a_1(i) \cdot z^{-1} \quad (1)$$

where $z^{-1}$ represents a delay of one sampling interval; $a_1(i)$ is a vector of linear prediction coefficients ($0 \leq i \leq L$); L is the filter order and also the size of vector $a_1(i)$, $a_1(O)$ being equal to 1. Coefficient vector $a_1(i)$ must be determined for each block of digital samples X(j) with an updating frequency equal to J subband samples.

Said vector is selected from a codebook of vectors of quantized linear prediction coefficients $a_{1h}(i)$, where h is the vector index in the codebook ($1 \leq h \leq H$).

The selected vector allows the optimal inverse filter to be built up for each block of samples $X_1(j)$; the selected vector index will be hereinafter denoted by $h_{1ott}(J)$.

The technique used to generate the codebook of vectors of quantized linear prediction coefficients $a_{1h}(i)$ is the known vector quantization technique involving measurement and minimization of the spectral distance $d_{LR}$ (likelihood ratio measure) between normalized gain linear prediction filters described for instance in the paper by B. H. Juang, D. Y. Wong, A. H. Gray, "Distortion Performance of Vector Quantization for LPC Voice Coding", IEEE Transactions on ASSP, vol. 30, n. 2, pp. 294–303, April 1982.

The same technique is also used to choose the coefficient vector $a_{1h}(i)$ in the codebook.

This coefficient vector $a_{1h}(i)$, which allows the building of the optimal LPC inverse filter is that which allows the minimization of the spectral distance $d_{LR}(h)$ derived from the relationship:

$$d_{LR}(h) = \frac{\sum_{i=-L}^{L} C_{1a}(i,h) \cdot C_{1x}(i)}{\sum_{i=-L}^{L} C_{1a}(i) \cdot C_{1x}(i)} - 1 \quad (2)$$

where $C_{1X}(i)$, $C_{1a}(i, h)$, $C^*_{1a}(i)$ are the autocorrelation coefficient vectors respectively of blocks of digital samples $X_1(j)$, of coefficients $a_{1h}(i)$ of generic LPC filter of the codebook, and of filter coefficients calculated by using current samples $X_1(j)$.

Minimization of the distance $d_{LR}(h)$ is equivalent to finding the minimum value of the numerator of the fraction in the relationship (2), since the denominator depends solely on the samples $X_1(j)$.

Vectors $C_{1X}(i)$ are computed starting from the input samples $X_1(j)$ of each block, after weighting according to the known Hamming curve over a length of F samples and with superposition between consecutive windows such that the F consecutive samples are centered around the J samples of each block.

Vector $C_{1X}(i)$ is given by the relationship:

$$C_{1x}(i) = \sum_{j=1}^{F-M} X_1(j) \cdot X_1(j + i) \quad (3)$$

Vectors $C_{1a}(i,h)$ on the other hand are extracted from a corresponding codebook in one-to-one correspondence with that of vectors $a_{1h}(i)$.

Vectors $C_{1a}(i,h)$ are derived from the following relationship:

$$C_{1a}(i,h) = \begin{cases} \sum_{q=0}^{L-1} a_{1h}(q) \cdot a_{1h}(q + i) \\ 0 \text{ for } i > L \end{cases} \quad (4)$$

For each value h, the numerator of the fraction present in relationship (2) is calculated using relationships (3) and (4); the index $h_{1ott}$ supplying the minimum value of $d_{LR}(h)$ is used to choose vector $a_{1h}(i)$ from the relevant codebook.

As a result of inverse LPC filtering a residual signal sample $R_1$ is obtained for each block of subband $X_1$. The sequence of $R_1$ samples is divided into blocks $R_1(k)$, with k sample index in the block ($1 \leq k \leq K$). It is to be noted that in general $K \neq J$.

In the nonlimiting example described here the following values are used: J=40, K=20, corresponding to time periods of 20 and 10 ms respectively if the above described subband splitting is used.

Each block $R_1(k)$ undergoes an estimate of its r.m.s. value $\sigma_1(k)$ according to the following relationship:

$$\sigma_1(K) = \beta_1 \cdot \sum_{k=1}^{K} |R_1(k)| \quad (5)$$

where $\beta_1$ is a constant experimentally determined so as to maximize the correlation between the actual r.m.s. value and the estimated one.

The operations of inverse LPC filtering and estimate of residual signal $R_1$ are made necessary by the different updating period of coefficients $a_{1h}(i)$ and r.m.s. value $\sigma_1(k)$ respectively updated every J and K digital samples of subband $X_1$.

In fact it is known that the numerator of relationship (2) supplying spectral distance $d_{LR}(h)$ is also the measurement of the energy associated with the residual signal obtained by filtering the samples of subband $X_1$ by using coefficients $a_{1h}(i)$.

Then, if J=K, the minimum value of numerator of $d_{LR}(h)$ would correspond also to the energy of the considered block of samples $X_1$, and hence the r.m.s. value calculation would be immediate, as dependent on a simple relation with the energy value.

The deriving complexity increase is justified by improved performances in subband quantization operations (which will be described hereinafter) obtained by using a 10 ms updating period for the r.m.s. values $\sigma_1(k)$, instead of 20 ms (used for the vectors of coefficients $a_{1h}(i)$).

On the other hand, if a 10 ms period were used also for the updating of coefficients $a_{1h}(i)$, coded speech signal transmission rate also ought to be increased, owing to the presence of a higher data number to be transmitted. The digital samples of subband $X_2$ undergo the same operations described up to now for $X_1$, thus obtaining optimal vector indices $h_{2ott}(J)$ and r.m.s. values $\sigma_2(k)$. As to the digital samples of subband $X_3$, only the estimate of r.m.s. value $\sigma_3(k)$ is effected directly on them, without carrying out prediction operations. In this case samples $X_3$ are split into blocks $X_3(k)$ and r.m.s. value $\sigma_3(k)$ is given by the following relationship derived from relationship (5):

$$\sigma_3(K) = \beta_3 \cdot \sum_{k=1}^{K} |X_3(k)| \qquad (6)$$

The samples of subband $X_4$ are not considered since their energy contribution is extremely low and their exclusion does not entail relevant errors in the decoded reconstructed signal.

The terms of r.m.s. values $\sigma_y(k)$, with $y=1, 2, 3$ subband index, undergo a quantization operation.

A scalar quantization separately performed on each one of three r.m.s. components is preferred instead of a vector quantization on the r.m.s. term which would be justified by the high degree of correlation between them.

In fact since quantized-value indices are to be transmitted, quantization and hence line transmission of the three components one at a time offers higher reliability against possible channel errors. In the of scalar quantization in fact, a channel error altering a component does not affect the value of the others, while in case of vector quantization the whole term is altered.

Besides scalar quantization increases the transmission rate, but is less complex then vector quantization and requires fewer operations.

Quantized r.m.s. values $\partial_y(k)$ are obtained from scalar quantization.

Indices $s_y(K)$ of the levels selected in quantizers are sent onto the line.

The determination of the number of subband coding bits required for the operations of point (C) is carried out at this point and is made to depend on the relative energy of three subbands $X_y$: it is carried out at block frequency (every K samples), so as to mimize the total means distortion D(K) introduced with quantization and given by the following relation:

$$D(K) = \frac{1}{3} \cdot \sum_{y=1}^{3} \sigma_y^2(K) \cdot d(y, b_y) \qquad (7)$$

where $\sigma_y^2(K)$ is the square of quantized r.m.s. value, i.e. the energy associated with the signal of subband $X_y$; $d(y,by)$ represents the mean square error relating to an optimal quantizer with variance equal to 1; by represents the generic number of bits assigned to the quantization of the y-th subband, wherefrom number $2^{by}$ of levels of the quantizer to be used in the subsequent step (C) is obtained, wherein, as it will be seen, the signals of subbands $X_y$ are quantized with a varible bit number.

Hence relation (7) is calculated for all the possible combinations of terms of numbers of bits $b_y$. It is to be noted that the total number Nt, given by the following relation, of subband encoding bits is constant and is a function of the desired transmission rate on line:

$$NT = \sum_{y=1}^{3} b_y$$

Hence the term combination number $b_y$ is limited.

The term which supplies minimum distorsion D(K) is selected as optimal and supplies the optimum number of encoding bits $B_y(k)$ for each subband $X_y$ to be used every K subband samples.

(C) The sample blocks of subbands $X_1$, $X_2$ are submitted to quantization with a known adaptive predictive coding method whose main steps will be described hereinafter.

From the samples of subbands $X_y(m)$ (now it is $y=1, 2$ and m is the sample index) there are extracted the corresponding samples or residual signal $E_y(m)$ in a way to be described hereinafter.

Residual signal $E_y(ù)$ is divided by the previously-calculated corresponding quantized r.m.s. value $\partial_y(k)$ value changes at a frequency of K samples of $X_y(m)$), thus obtaining a normalized residual signal $EN_y(m)$ which is quantized by using a quantizer out of a set of quantizers having a different number of levels. A set of quantizers are used for each subband.

The previously-determined number of bits $B_y(k)$ selects, every K subband samples, the set quantizer which has then $2^{By}$ levels.

Index $e_y(m)$ of the level selected in the quantizer is sent onto the line.

Quantized normalized residuals $\hat{E}N_y(m)$ are obtained as a quantization effect.

Residuals $E_y(m)$ are generated as follows: quantized normalized residuals $\hat{E}N_y(m)$ are multiplied by the corresponding quantized r.m.s. values already used, $\partial_y(k)$, thus obtaining quantized residuals $\hat{E}_y(m)$ whereupon the so-called "backward" prediction operation is performed to generate a predicted signal $P_y(m-1)$ starting from the reconstructed signal $\hat{X}_y(m)$ according to the relation:

$$\hat{X}_y(m) = \hat{E}_y(m) + P_y(m-1) \qquad (8)$$

Then a linear filtering operation $P_y(m)$ is carried out of the following type:

$$P_y(m) = \sum_{i=1}^{L} a_{yhott}(i) \cdot \hat{X}_y(m - i) \qquad (9)$$

where m is the sample index; $a_y$hott(i) is the i-th component of the linear prediction coefficient vector selected from the corresponding codebook as already seen at point B).

Then residuals $E_y(m)$ are obtained by the following difference:

$$E_y(m) = X_y(m) - P_y(m-1) \qquad (10)$$

However, the samples of subband $X_3$ are submitted to non-predictive quantizazion. Samples $X'^*(m)$, m is still the sample index, are directly divided by the corresponding-quantized r.m.s. value $\partial_3(k)$ thus obtaining normalized values $EN_3(m)$, which are quantized by using also in this case a quantizer out of a set of quantizers having different number of levels and thus obtaining quantized normalized values $\hat{E}N'^*(m)$.

The previously-determined number of coding bits $B'^*(k)$ is used to select the set quantizer.

Index $e'(m)$ of the level detected in the quantizer is sent onto the line.

Hence, on the line there are transmitted:
- indices $h_{yott}(J)$ (with $y=1, 2$) of linear prediction coefficient vectors $a_{yh}(i)$ selected in the pertaining code-books of subbands $X_y$, with an updating period of J subband samples;
- indices $s_y(k)$ (with $y=1, 2, 3$) of quantized r.m.s. values $\partial_y(k)$ selected in the corresponding quantizers, with updating period equal to K subband samples;
- indices $e_y(m)$ (with $y=1, 2$) of quantized normalized residuals $\hat{E}N_y(m)$, and indices $e_3(m)$ of quantized normalized values $\hat{E}N_3(m)$ identified in the quantizers selected in the relevant set at a subband sample frequency.

The technique of generation of quantizer sets used for subbands $X_1, X_2, X_3$ will be described. Subband sample training sequences are generated starting from a preselected speech signal training sequence.

As to subbands $X_1, X_2$, the codebooks of linear-prediction coefficient vectors $a_{yh}(i)$ are first generated, as mentioned at point (B) of the method, the optimal vectors for the training sequence are then determined.

For each number of coding bits $b_y$ and for each one of subbands $X_1, X_2$ the following operations are executed:
(1) $2^{b_y}$ quantizer levels are initialized by optimal values for a Laplacian-distribution speech signal with unit variance and null mean value known in the literature;
(2) the adaptive predictive algorithm also used during coding and described at point (C) of the method is applied to the corresponding training sequence, to determine normalized residual values $EN_y(m)$, by using optimal linear-predictive coefficient vectors $a_{yhott}(i)$ of the training sequence;
(3) $2^{b_y}$ subsets (one for each quantizer level) of normalized residuals $EN_y(m)$, obtained at point 2), are generated, by including in each subset the values having minimum distance from the same quantizer level; the minium distance $d_{WF}$ is calculated by looking for the minimum of values:

$$d_{WF} = \partial_y(K)^2 \cdot [EN_y(m) - \hat{E}N_y(m)]^2 \quad (11)$$

where $EN_y(m)$ is the generic quantizer level. Thus $2^{b_y}$ distance values will be computed for each $EN_y(m)$, and then compared with each other;
(4) The centroid of each subset is computed and taken as a new quantizer level.

The method described is repeated till the new levels are no longer basically different from the preceding ones. Generally two iterations are sufficient.

For generating the set of quantizers used for subband $X_3$, from the training sequence a corresponding sequence of normalized values $EN_3(m)$ is obtained; for each quantizer, i.e. for each value $b_3$, $2^{b_3}$ subsets are identified as at the preceding point (3); the subset centroids are computed and, without carrying out further iterations, are taken as definite values of quantizer thresholds.

The decoding method provides the following operations.

By using received indices $s_y(K)$ the corresponding quantized r.m.s. values $\partial_y(K)$ are identified with operations equal to those computed during coding.

Hence the terms of optimal coding bit numbers $B_y(K)$ are identified with a method equal to that described for coding.

By using received indices $e_y(m)$ the corresponding quantized normalized residuals $\hat{E}N_y(m)$ are identified in the quantizers chosen through $B_y(K)$ values in the sets of quantizers already used during coding.

Values $\hat{E}N_y(m)$ of subbands, $X_1, X_2$ are multiplied by the corresponding quantized r.m.s. values $\partial_y(K)$ thus obtaining quantized residuals $\hat{E}_y(m)$ as during coding, and on the latter the same "backward" linear predictive adaptive operation described at point (C) of the coding method [computation of equations (8), (9)] is executed to generate reconstructed signals $\hat{X}_y(m)$ of subbands $X_1$ and $X_2$.

The values $\hat{E}N_y(m)$ of subband $X_3$ are multiplied by the corresponding quantized r.m.s. values $\partial_y(K)$, thus directly obtaining the samples of reconstructed signal $\hat{X}_3(m)$ for subband $X_3$.

The samples of the three subbands of the reconstructed signal $\hat{X}_y(m)$ are then filtered by a QMF filter bank, a duplicate of that used in step (A) of the coding method, to generate the reconstructed digital speech signal $\hat{X}$ which, converted into analog, gives rise to the reconstructed speech signal during decoding.

The method variant takes also into account the samples of the fourth subband $X_4$, which are subjected during coding to operations similar to those envisaged for the third subband $X_3$.

R.m.s. values $\sigma_4(K)$ are obtained from the samples of subband $X_4$ in accordance with relation (6) wherein it is enough to replace subscript 3 by subscript 4.

By scalar quantization operations, quantized r.m.s. values $\partial_4(K)$ are obtained with corresponding quantization level indices $s_4(K)$. Total mean distortion $D(k)$ to be minimized defined in (7) is now to be extended to the four subbands, thus obtaining sets of four numbers of optimal coding bits $B_y(K)$ with $y=1, 2, 3, 4$.

From subband samples, there are then obtained, utilizing a set of quantizers of the fourth subband, quantized normalized values $\hat{E}N_4(m)$ and indices of quantization level $e_4(m)$.

With respect to the preferred embodiment, by that variant additional coding information is generated consisting of level indices $s_4(K)$ of quantized r.m.s. values, and of level indices $e_4(m)$ of normalized quantized values.

The set of quantizers of the fourth subband $X_4$ is generated as has been described for the third subband.

Samples of the reconstructed signal of the fourth subband $X_4(m)$ are obtained during decoding, which samples, filtered by a QMF filter bank, contribute to generate the reconstructed speech signal.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
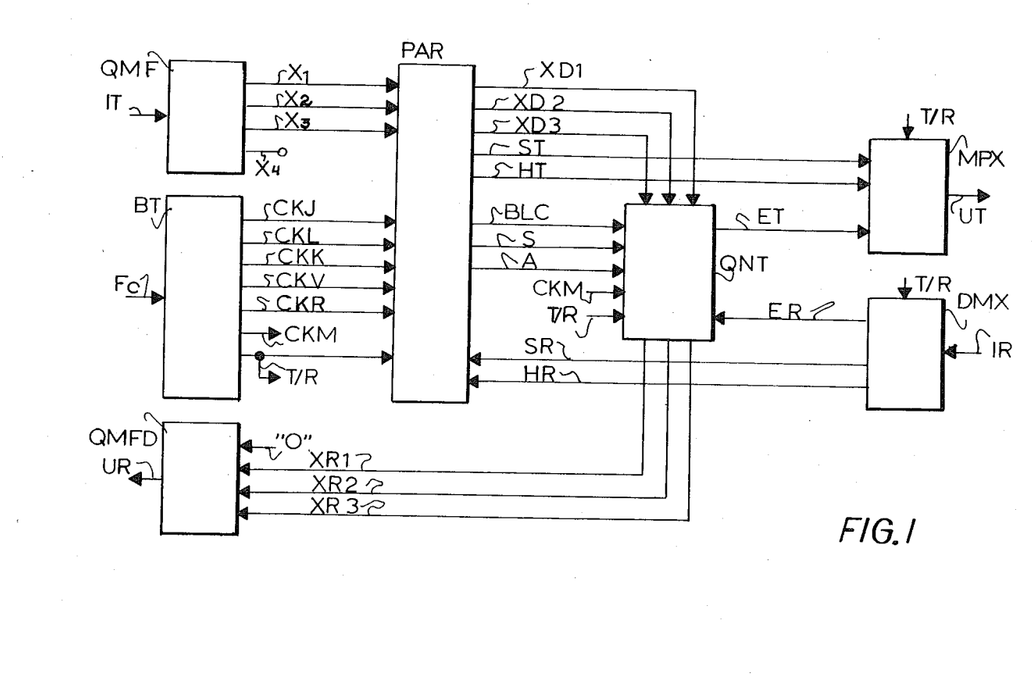
FIG. 1 is a general block diagram of the device.

In FIG. 1 the block QMF denotes a block consisting of a bank of FIR digital filters of the QMF type to filter the input digital signal IT at the coding side, in accordance as has been described at point (A) of the method description.

The bank of QMF filters has a two-level cascaded structure; the first level consists of filters using 32 coefficients to split the input signal band into two subbands, while the second level consists of filters using 16 coefficients for the further splitting of the signal into the four subbands $X_1, \ldots, X_4$.

The coefficients used are e.g. those described in the paper by J. D. Johnston "A filter family designed for use in Quadrature Mirror Filter banks", Proceedings IEEE International Conference on ASSP, April 1980, pp. 291–294.

The choice made on the number of filter coefficients permits the best compromise between computational complexity and out-of-band signal attenuation.

Input signal IT is obtained from the analog speech signal by band limitation to 3 to 4 kHz and sampling at frequency $f_c = 8$ kHz with circuits of known type not represented in the Figure.

Subband signals outgoing on the respective buses of the parallel type $X_1, X_2, X_3, X_4$ have a bit-rate of 2kbit/s determined by a suitable subsampling frequency.

Subband frequency $X_4$ is not considered by the coder.

QMFD denotes a block comprising a second filter bank having a structure which is exactly the converse to that of block QMF.

QMFD block obtains digital signal UR reconstructed during decoding by recombining the reconstructed digital signals $X_1, X_2, X_3$ of the three subbands present on bases XR1, XR2, XR3 arriving from block QNT; the signal of subband $X_4$ is simulated by a sequence of logic 0's. Signal UR is then converted into analog form by an ordinary digital-to-analog converter, not shown in FIG. 1, to obtain the reconstructed speech signal.

Implementation of blocks QMF and QMFD is no problem to worker skilled in the art starting from what is known in the art from the data supplied by the present description.

PAr denotes a block to compute the parameters necessary to coding-decoding.

More particularly PAR implements the functions described at point (B) of the coding method and computes: every 20 ms indices $h_{yott}(J)$ and corresponding coefficient vectors $a_{yhott}(i)$ of linear predictive inverse filters for subbands $X_1, X_2$; every 10 ms, indices of levels $s_y(K)$ and the corresponding quantized r.m.s. values $\partial_y(K)$, as well as the numbers of coding bits $B_y(K)$ for subbands $X_1, X_2, X_3$.

PAR computes also coefficient vectors $a_{yhott}(i)$, quantized r.m.s. values $\partial_y(K)$, and the number of coding bits $B_y(K)$ necessary to decoding phase.

PAR receives from QMF the subband signals on buses $X_1, X_2, X_3$, it re-emits these signals duly delayed on buses XD1, XD2, XD3 towards block QNT. PAR receives from block DMX indices $s_y(K)$, $h_{yott}(J)$ for decoding phase on buses SR and HR, and emits on buses ST and HT towards block MPX indices $s_y(K)$, $h_{yott}(J)$ for coding phase; it emits on buses BLC, S, A, towards block QNT the corresponding values $B_y(K)$, $\partial_y(K)$, $a_{yhott}(i)$ for coding and decoding phases.

Figure 2:
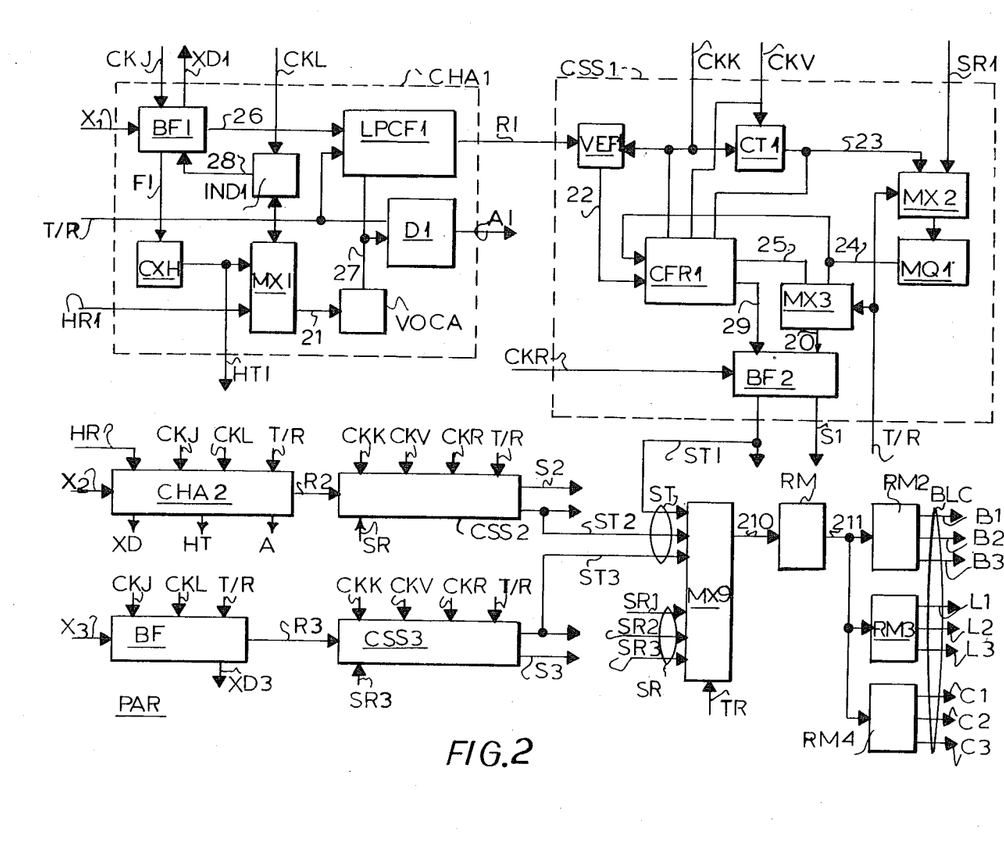
FIG. 2 is a circuit diagram of block PAR of FIG. 1.

Block PAR structure will be examined in detail in connection with FIG. 2.

QNT denotes a block to carry out direct quantization of subband signals described at point (C) of the coding method, and inverse quantization to obtain subband signals reconstructed during decoding.

QNT receives subband signals on buses XD1, XD2, XD3 from block PAR and emits on bus ET towards block MPX the corresponding indices $e_y(m)$ during coding; it receives indices $e_y(m)$ from block DMX on bus ER and emits on buses XR1, XR2, XR3 towards block QMFD subband signals $X_1, X_2, X_3$ reconstructed during decoding.

In addition QNT receives from block PAR values $a_{yott}(i)$, $\partial(K)$, $B_y(K)$ on corresponding buses A, S, BLC for both phases.

Figure 3:
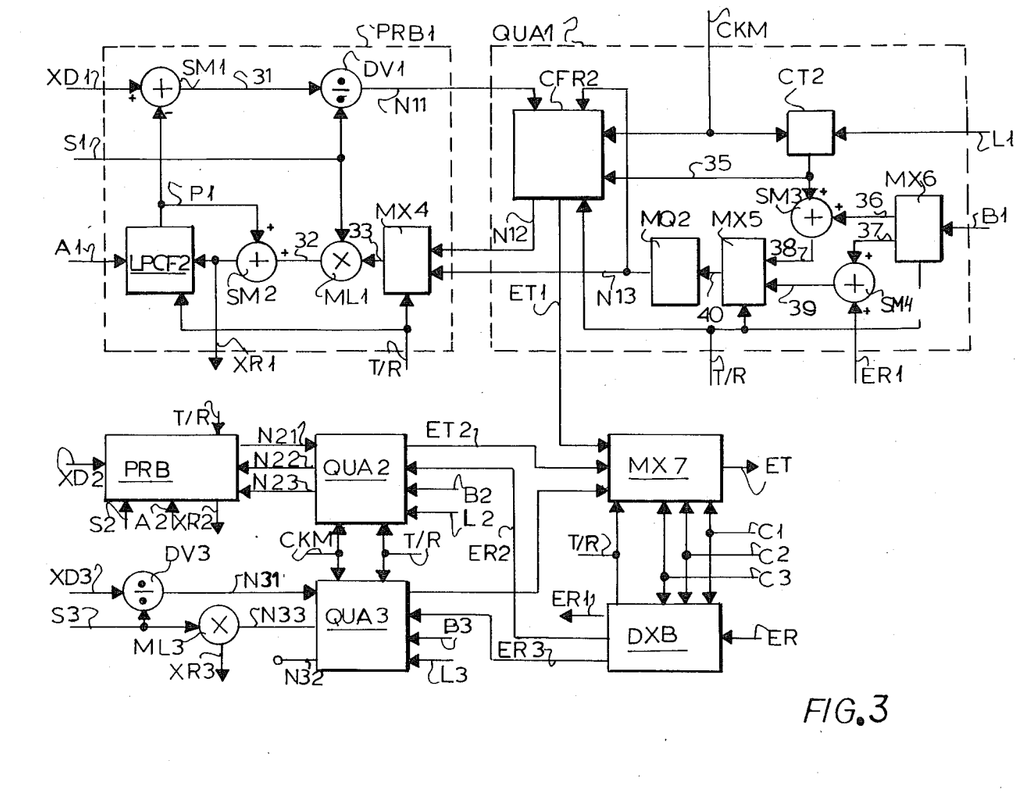
FIG. 3 is a circuit diagram of block QNT of FIG. 1.

The structure of block QNT will be examined in detail in connection with FIG. 3.

MPX denotes an ordinary multiplexer generating the coded digital signal emitted on output bus UT.

MPX sequentially makes up the signals present on input buses ST, HT, ET and generates coded signal frames on bus UT which frames can be sent to a line coder of any known type inserting suitable frame synchronism bits.

These frames can undergo a modulating operation in order to be transmitted on translated band lines.

DMX denotes an ordinary demultiplexer carrying out a function which is the inverse of to that of multiplexer MPX; DMX splits coded-signal frames arriving by the input bus on the decoding side IR, e.g. from a line decoder dual to the decoder provided at the MPX output.

MPX and DMX are activated through signal T/R during coding and decoding respectively.

BT denotes a block acting as a time base, supplying the whole device with control and synchronization signals.

BT can be controlled by the signal at sampling frequency $f_c$ and, in addition to usual synchronism signals which will be no longer mentioned for the sake of brevity, emits the signals on buses CKJ, CKL, CKK, CKV, CKR, towards block PAR, and on bus CKM towards block QNT; it emits also signal T/R controlling the sequence of coding and decoding steps.

In FIG. 2 CHA1 denotes a block, whose structure is surrounded by the dotted line, determining linear prediction coefficient vectors $a_{1hott}(i)$ and corresponding indices $h_{1ott}(J)$ for subband $X_1$ during coding and decoding, and also residual signal $R_1(m)$.

CHA1 comprises circuit blocks BF1, LPCF1, CXH, MX1, VOCA, D1, IND1.

BF1 denotes a random-access memory organized into two equal and interchangeable units to temporarily store and group into blocks the samples of subband $X_1$ it sequentially receives on bus $X_1$.

Each BF1 unit has F=60 sample capacity. Every block of J subband samples, a unit of BF1 temporarily stores the last 10 samples of the preceding block, the 40 samples of the present block and the first 10 samples of the subsequent block as is necessary for the subsequent weighting operation of blocks of samples by to the overlapping between subsequent blocks, already mentioned at point (B) of the method description.

At the same time the other unit of BF1, containing the samples of the preceding period, is sequentially read through a high speed addressing supplied by block IND1 on bus 28, and supplies all the F samples on bus F1 to block CXH, and then on bus 26 and afterwards on XD1 supplies central J samples of the preceding block.

At the subsequent block of J samples the two units are mutually exchanged.

Then sample writing in BF1 memory units takes place synchronously at the subband bit rate, and is controlled by a suitable synchronization signal present on bus CKJ arriving from time base BT of FIG. 1.

Reading in BF1 takes place, on the contrary, at a higher bit rate to allow downstream circuits to carry out corresponding real-time operations.

Block IND1 comprises a counter, synchronized by fast synchronism signal arriving, on wire CKL, from time base BT of FIG. 1, supplying BF1 reading addresses on bus 28. IND1 is activated during coding phases by signal on wire T/R coming from BT.

CXH denotes a block computing indices $h_{1ott(J)}$ of coefficient vectors $a_{1hott}(i)$.

CXH sequentially receives, through data bus F1, F samples stored in BF1.

CXH computes autocorrelation coefficient vectors $C_{1X}(i)$ of sample blocks $X_1$ in accordance with relation (3); using then autocorrelation coefficient vectors $C_{1a}(i,h)$ of coefficients $a_{1h}(i)$ belonging to a codebook contained in one of its internal memories, CXH calculates for each of them the numerator of relation (2), compares with each other the results obtained to find the minimum supplying the desired index $h_{lott}(J)$; said index is sent onto bus HT1.

The implementation of block CXH can be derived from what has been stated at point (B) of the method description, with reference to what is known from the art as described e.g. in the above-cited paper by B. H. Juang and al.

Bus HT1 is connected to an input of multiplexer MX1 to whose second input bus HR1 is connected, whereupon indices $h_{lott}(J)$ are present for the decoding step arriving from block DMX of FIG. 1.

MX1 connects one of the two input buses to output bus 21 on the basis of the logic level of the signal on wire T/R applied to control input.

Indices $h_{lott}(J)$ of coding and decoding phases will then be present on bus 21 and applied as addresses to ROM memory VOCA. VOCA contains the codebook of linear prediction coefficient vectors $a_{1h}(i)$. In the example described here the codebook for subband Xhd 1 contains H=128 vectors of L=6 component each: hence indices $h_1(J)$ will have 7-bit size.

Coefficient vectors $a_{1hott}(i)$ will be present on VOCA data output on bus 27 both for the coding and decoding phase.

D1 denotes a known structure block performing as a delay line for coefficient vectors present on bus 27, supplied on output bus A1.

The delay is introduced only during coding to take into account the time spent by block CSS1 to carry out its operations, so as to render data emission on buses A1, ST1, S1 XD1 synchronous. The signal on wire T/R controls delay introduced by D1.

LPCF1 denotes a known structure block performing as LPC inverse filter according to relation (1) using the coefficient vectors of coding-step present on bus 27.

LPCF1 sequentially receives the samples of subband $X_1$ on bus 26, and for each of them it determines a sample of residual signal $R_1(m)$, it sends to the output on parallel bus R1. LPCF1 is activated during coding phase by the signal on wire T/R.

CSS1 denotes a block, whose structure is surrounded by a dashed line, determining quantized r.m.s. values $\partial_1(K)$ during coding and decoding and indices $s_1(K)$ for the coding alone.

CSS1 consists of circuit blocks VEF1, CFR1, MX3, CT1, MX2, MQ1, BF2.

VEF1 is a block calculating r.m.s. value $\sigma_1(K)$ of sets of K consecutive samples of residual signal $R_1(m)$ received on bus R1, in accordance with relation (5).

VEF1 can be e.g. implemented by an adder-accumulator which, at a frequency of K samples of $R_1(m)$, determined by synchronism signal CKK it receives from time base BT of FIG. 1, supplies the sum of the moduli of the samples present on bus R1 to a multiplier which multiplies it by constant $\beta_1$: the multiplier output on bus 22 carries r.m.s. values $\sigma_1(K)$.

MQ1 denotes a ROM memory containing the levels of the quantizer used to quantize r.m.s. values, i.e. all possible quantized r.m.s. values $\partial_1(K)$. In the example described here, 16 levels are used; hence indices $s_1(K)$ have 4-bit size.

The memory is read by using as addresses said indices arriving from the output of multiplexer MX2, which is controlled by the signal on wire T/R: for coding phase, indices $s_1(K)$ are present on bus 23 connected to an input of MX2, while during decoding they are present on bus SR1 which arrives from block DMX of FIG. 1 and is connected to another input od MX2.

CT1 denotes a modulous 16 counter which at each synchronisation signal pulse CKK starts a counting cycle to generate indices $s_1(K)$ which sequentially address the whole memory MQ1 supplying the quantizer levels on data bus 24.

CT1 is also synchronized by fast synchronism signal CKV arriving from time-base BT of FIG. 1, and which has such a frequency that determines a complete counting of CT1 for each CKK pulse.

Bus 23 is also connected to block CFR1, which is to determine for each block of K samples of residual signal $R_1(M)$ quantized r.m.s. value $\partial_1(K)$ of coding phase emitted on bus 25.

CFR1 compares value $\sigma_1(K)$, present on bus 2 and connected to one of its inputs, with all the values $\partial_1(K)$ present on bus 24, keeping stored, in an internal the value $\partial_1(K)$ which gives rise to the minimum difference with respect to the value on bus 22 and the corresponding index $s_1(K)$. These values are then supplied on buses 25 and 29 at the end of each comparison cycle.

The sending on buses 25, 29 of stored values is controlled by pulses of synchronism signal CKK.

Buses 24 and 25 are connected to two inputs of a multiplexer MX3 which is controlled by signal T/R: at the output of MX3 on bus 20 there are present quantized r.m.s. values for the coding phase (arriving from bus 25) and for decoding phase (arriving from bus 24).

BF2 denotes an ordinary buffer register which temporarily stores two consecutive pairs of values $\partial_1(K)$, $s_1(K)$ present on buses 20, 29; the pairs are those computed on two consecutive blocks of K subband samples corresponding to the block of J samples whereupon CHA1 calculates vector $a_{1hott}(i)$ present on bus A1.

BF2 value pairs $\partial_1(K)$, $s_1(K)$ on buses, S1, ST1 respectively on the basis of the pulses of synchronism signal CKR arriving from time base BT of FIG. 1.

BF2 acts as block D1, i.e. it aligns in time the values $\partial_1(K)$, $s_1(K)$ with subband signal samples present on bus XD1.

It is to be noted that the updating frequency of data present on buses S1, ST1 is twice as high as that relevant to the data present on bus A1.

CHA2 denotes a block whose internal structure is similar to that of block CHA1, and processes the samples of subband $X_2$ present on bus $X_2$ and supplies: on bus A2 linear prediction coefficient vectors $a_{2hott}(i)$ for coding and decoding phases; indices $h_{2ott}(J)$ on bus HT2, samples of residual signal $R_2(m)$ on bus R2, and subband signal delayed on bus XD2 for coding phase.

CHA2 receives synchronism signals on buses CKJ, CKL, the signal on wire T/R, indices $h_{2off}(J)$ for decoding phase on bus HR2.

For subband $X_2$, there is used in CHA2 a codebook of linear prediction coefficient vectors $a_{2h}(i)$ containing H=32 vectors of L=4 components each, with subsequent size of indices $h_2(J)$ of 5 bits.

BF3 denotes a block containing a RAM memory of BF1 type and an addressing unit for reading of the type IND1; BF3, controlled by synchronism signals on buses CKJ, CKL and the signal on wire T/R, temporarily stores the samples of subband $X_3$ present on bus $X_3$, and reemits them duly delayed on buses R3 and XD3, temporarily aligned with those present on buses R1 and XD1 respectively.

CSS2, CSS3 denote two blocks whose internal structure is similar to that of block CSS1.

CSS2 receives the samples of residual $R_2(m)$ during coding on bus R2 and indices $s_2(K)$ during decoding on bus SR2, and determines quantized r.m.s. values $\partial_2(K)$ emitted on bus S2 for coding and decoding phases, in addition to indices $s_2(K)$ for coding phase emitted on bus ST2.

CSS3 receives, during coding, delayed subband signal samples present on bus R3 and indices $s_3(K)$ during decoding on bus SR3 and determines quantized r.m.s. values $\partial_3(K)$ for both phases emitted on bus S3, in addition to indices $s_3(K)$ during coding emitted on bus ST3.

CSS2, CSS3 receive synchronism signals on buses CKK, CKV, CKR and the signal on wire T/R.

The level number of $\sigma_2(K)$, $\sigma_3(K)$ quantizers is equal to that of $\sigma_1(K)$, while the level values are different.

MX9 denotes a multiplexer which, based on the logic level of signal T/R applied to control input, supplies on output bus 210 to block RM1 the term of indices $s_y(K)$ during coding present on buses SR1, SR2, SR3 or, during decoding, present on buses SR1, SR2, SR3.

RM1, RM2, RM3, RM4 denote 4 memories of ROM type forming a simple circuit which determines the number of bits $B_y(K)$ during coding of signals of subbands $X_y$.

This simple implementation is attained on the basis of the following considerations: in the method description it is mentioned that the total coding bit number NT of the three subbands is taken as a constant; besides being $\partial_y(K)$ quantized values, they can only assume a finite number of combinations of terns of values (in the example described here, as there are $2^4$ values of $\partial_y(K)$ for each subband, there will be obtained $2^{12}=4.096$ terns of values); a single configuration of number of bits, giving the minimum value of D(K) according to relation (7), corresponds to each $\partial_y(K)$ term.

If, for example, a 16 kbit/s on-line transmission rate is desired, NT=7 is to be selected, as will be seen also hereinafter.

Besides it has been experimentally determined that each $b_y$ can assume only 5 values from, 1 to 5 bits, thus obtaining a total number of 15 configurations of $b_y$ terms, according to the following table:

| bit configuration | Number of bits for each band | | |
|---|---|---|---|
| | $b_1$ | $b_2$ | $b_3$ |
| 1 | 5 | 1 | 1 |
| 2 | 4 | 2 | 1 |
| 3 | 3 | 3 | 1 |
| 4 | 2 | 4 | 1 |
| 5 | 1 | 5 | 1 |
| 6 | 4 | 1 | 2 |
| 7 | 3 | 2 | 2 |
| 8 | 2 | 3 | 2 |
| 9 | 1 | 4 | 2 |
| 10 | 3 | 1 | 3 |
| 11 | 2 | 2 | 3 |
| 12 | 1 | 3 | 3 |
| 13 | 2 | 1 | 4 |
| 14 | 1 | 2 | 4 |
| 15 | 1 | 1 | 5 |

Then for each term of values $\partial_y(K)$ there have been previously computed the corresponding 15 values D(K) and their minimum has been determined: the number of the corresponding configuration of bit numbers $b_y$ (one of the numbers of the left column of the table) has been written in memory RM1 in such a position that the term of the indices $s_y(K)$ present on bus 210 is the reading address.

Hence, for both steps, RM1 will supply on bus 211, for each index term present on bus 210, the corresponding configuration number which in turn is the reading address for memories RM2, RM3, RM4.

In RM2 there are stored, for each coding bit configuration, three addresses for the memories of subband quantizer sets, which will be mentioned with relation to FIG. 3. Each address relates to the first at quantizer level chosen for the corresponding subband.

RM2 emits on bus B1 the address for the quantizer of the first subband, on bus B2 that for the second, on bus B3 that for the third.

In RM3 there are stored, for each coding bit configuration, three numbers of levels of the three selected subband quantizers. RM3 emits on bus L1 the number of levels of the quantizer of the first subband, on bus L2 that of the second subband, on bus L3 that of the third.

In RM4 there are stored, for each coding bit configuration, suitable bit configurations forming command signals for circuits of block QNT of FIG. 3, emitted on buses C1, C2, C3.

As shown, said memories do not contain numbers of bits $B_y(K)$, but a coding of them which is function of how it will be used by circuit QNT of FIG. 3. Hence this coding is to be intended as a nonlimiting but typical example of the embodiment described here.

Buses ST1, ST2, ST3 form bus ST of FIG. 1; buses HT1, HT2 form bus HT; buses SR1, SR2, SR3 bus SR; buses HR1, HR2 bus HR; buses B1, B2, B3, L1, L2, L3, C1, C2, C3 form bus BLC; buses S1, S2, S3 bus S; buses A1, A2 form bus A.

In FIG. 3 PRB1 denotes a block, whose structure is emphasized inside the dashed line it is delimited by, carrying out "backward" adaptive linear prediction function, described at point (C) of the method, on the samples of subband $X_1$ in both phases.

PRB1 comprises circuits SM1, DV1, MX4, ML1, SM2, LPCF2.

SM1 denotes a block executing the difference, in accordance with relation (10), between the samples of subband $X_1$, present on bus XD1 arriving from block CHA1 of FIG. 2, and the samples of the predicted signal $P_1(m-1)$ present on bus P1, supplying on bus 31 residual samples $E_1(m)$; the latter samples are divided in divider DV1 by quantized r.m.s. values $\partial_1(K)$ present on bus S1 arriving from block CSS1 of FIG. 2, obtaining the samples of normalized residual $EN_1(m)$ supplied on bus N11.

MX4 denotes a multiplexer which, controlled by signal T/R, supplies on bus 33 the samples of quantized normalized residual $\hat{E}N_1(m)$, present for the coding phase on bus N12 or for the decoding one on bus N13.

ML1 denotes a multiplier which executes the product of samples present on bus 33 and quantized r.m.s. values $\partial_1(K)$ present on bus S1, obtaining samples of quantized residual $\hat{E}_1(m)$ supplied on bus 32.

SM2 denotes an adder computing, in accordance with relation (8), the sum of samples present on buses 32 and P1 to obtain the samples of reconstructed signal $\hat{X}_1(m)$ supplied on bus XR1 for both phases.

LPCF2 denotes a block carrying out linear-predictive filtering operation, in accordance with relation (9), of the samples of reconstructed signal $\hat{X}_1(m)$ present on bus XR1, using the vectors of linear prediction coefficients $a_{1hott}(i)$ present on bus A1 and arriving from block CHA1 of FIG. 2, and obtaining the samples of predicted signal $P_1(m-1)$ supplied on bus P1 for both phases.

LPCF2 can be implemented by two linear prediction filters of known structure, one for coding the other for decoding, alternately activated by logic levels of signal T/R: this to retain from one frame to the other the contents of the filter registers forming delay lines for coding and decoding reconstructed signal which, otherwise would be altered by the presence at each phase of the signal samples of the other phase.

Otherwise LPC2 can be implemented by a single filter where only the delay line registers are doubled and alternately used.

QUA1 denotes a block, whose structure is emphasized within the delimiting dashed line, determining the samples of the quantized normalized residual $\hat{E}N_1(m)$ for both phases, and indices $e_1(m)$ for coding phase relevant to subband $X_1$.

QUA1 comprises circuit blocks CFR2, CT2, MX6, SM3, SM4, MX5, MQ2.

MQ2 denotes a ROM memory containing quantizers used for quantizing the samples of normalized residual $EN_1(m)$ of subband $X_1$.

In the non-limiting example described here, MQ2 consists of 5 quantizers, one for each number of bits $b_1$ by which values $EN_1(m)$ can be quantized.

For decoding phase, MQ2 emits on data bus N13, directly applied to an input of multiplexer MX4, the quantizer level addressed by the value present on address bus 40.

For coding phase, MQ2 emits in succession on data bus N13 all the levels of the selected quantizer, on the basis of sequential addressing received on bus 40.

Quantizer levels are supplied to a comparison input of comparator CFR2 to whose second comparison input there is connected bus N11 carrying values to be quantized.

CFR2 compares all the levels present on bus N13 with the value present on bus N11, keeping stored in an internal register the level which has originated minimum difference with respect to the value present on bus N11, and the corresponding index $e_1(m)$ supplied on bus 35: said values are then supplied on buses N12 and ET1 at the end of the comparison cycle, at the occurrence of a synchronism signal pulse CKM, and represent respectively the quantized normalized residual $\hat{E}N_1(m)$ of coding phase supplied at an input of multiplexer MX4, and index $e_1(m)$ to be sent over the line.

Each comparison cycle of CFR2 must be carried out during the time the values to be quantized remain on bus N11; CFR2 is activated by signal T/R.

CT2 denotes a usual programmable counter emitting on bus 35 all indices $e_1(m)$ of the quantizer to be addressed in memory MQ2. CT2 receives on wire CKM the signal of start of count and on bus L1, arriving from memory RM3 of FIG. 2, the number of levels of the selected subband quantizer, which is the programmed value for the counter.

MX6 denotes a common demultiplexer receiving on bus B1, coming from memory RM1 of FIG. 2, the address of the first level of selected subband quantizer, and emits it for coding phase on bus 36 and for decoding phase on bus 37, dependent on the logic level of signal T/R applied to control input.

SM3 denotes a conventional adder supplying on bus 38 the sum of the contents of buses 35 and 36 to generate the addresses for memory MQ2 for coding phase: the value present on bus 36 addresses in MQ2 the selected quantizer, while the various values present on bus 35 address all its levels.

SM4 denotes another adder supplying on bus 39 the sum of the contents of buses 37 and ER1, whereupon indices $e_1(m)$ of decoding phase are present, to generate the addresses for MQ2 in decoding: the value present on bus 37 addresses the selected quantizer, while the value present on bus ER1 addresses the quantizer level.

MX5 denotes a multiplexer supplying on bus 40, as addresses for MQ2, the contents of bus 38 or of bus 39 on the basis of the logic level of signal T/R.

PRB2 denotes a block analogous to PRB1, carrying out the function of adaptive linear prediction for subband $X_2$ in both phases.

During coding, PRB2 receives the subband samples on bus XD2 and quantized normalized residual $EN_2(m)$ on bus N22 and emits on bus N21 the samples of normalized residual $EN_2(m)$.

During decoding instead, PRB2 receives samples $\hat{E}N_2(m)$ on bus N23 and emits on bus XR2 subband samples.

Further, PRB2 receives on buses S2 and A2 quantized r.m.s. values $\partial_2(K)$ and coefficient vectors $a_{2hott}(i)$ for both phases; furthermore, it receives the signal on wire T/R.

DV3 denotes a usual divider carrying out the division between the samples of subband $X_3$ present on bus XD3 and quantized r.m.s. values $\partial_3(K)$ present on bus S3, thus obtaining normalized values $EN_3(m)$ during coding on bus N31.

ML3 denotes a usual multiplier executing a product between quantized normalized values $\hat{E}N_3(m)$ during decoding present on bus N33 and those present on bus S3, obtaining on bus XR3 the samples of subband $X_3$ during decoding.

QUA2, QUA3 denote two blocks analogous to QUA1, determining samples of quantized normalized values $\hat{E}N_2(m)$, $\hat{E}N_3(m)$ for both phases and indices $e_2(m)$, $e_3(m)$ during coding respectively for subbands $X_2$ and $X_3$.

QUA2 receives the normalized residual samples in coding on bus N21 from block PRB2, and emits thereto the samples of quantized normalized residual signal during coding on bus N22 and during decoding on bus N23; it emits indices $e_2(m)$ during coding on bus ET2 and receives those during decoding on bus ER2; in addition it receives on bus B2 the addresses of the first levels and on bus L2 the numbers of levels of the quantizers to be addressed in the internal memory of the set of quantizers of subband $X_2$.

QUA3 receives normalized value samples in coding on bus N31 and emits on bus N33 quantized normalized values in decoding, while quantized normalized values in decoding, present at output N32, are not used since, as already seen, for subband $X_3$ no prediction is carried out.

Besides QUA3 emits indices $e_3(m)$ in coding on bus ET3 and receives those in decoding on bus ER3; it also receives on bus B3 the addresses of the first levels and on bus L3 the number of levels of quantizers to be addressed in the internal memory of the set of quantizers of subband $X_3$.

MX7 denotes a multiplexer setting on bus ET the bits relating to indices $e_y(m)$ in coding extracting them from buses ET1, ET2, ET3, on the basis of control signals present on buses C1, C2, C3 arriving from memory RM4 of FIG. 2, in accordance with the table of coding bit configurations above.

According to said table, the control signals of bus C1 determine the connection on bus ET of the number of wires of bus ET1 corresponding to the number of coding bits allotted to subband $X_1$; the signals of buses C2, C3 carry out the equivalent task on the wires of buses ET2, ET3 relating to subbands $X_2$ and $X_3$ respectively.

DX8 denotes a demultiplexer carrying out a task of opposite kind to that carried out by multiplexer MX7, i.e. it extracts the bits of the terms of indices $e_y(m)$ in decoding present on bus ER coming from block DMX of FIG. 1, and distributes them on buses ER1, ER2, ER3 on the basis of control signals present on buses C1, C2, C3 in accordance with the table of coding bit configurations.

According to said table the control signals of bus C1 determine the connection on bus ER1 of the number of wires of bus ER corresponding to the coding bit number allotted to subband $X_1$; signals of buses C2, C3 carry out the equivalent task on the wires of buses ER2, ER3 relating to subbands $X_2$, $X_3$ respectively.

In the example described here, buses ET1, ET2, ET3, ER1, ER2, ER3 consist of 5 wires to contain maximum number of coding bits to be allotted to each subband (5 bits), while buses ET, ER consist of 7 wires to contain the total number of coding bits of each term of indices $e_y(m)$ which is constant (7 bits).

The outputs of MX7 and DX8 are activated respectively for coding and decoding phases by the logic levels of signal T/R.

The operation of the device, provided by the invention, will be now described.

Blocks QMF and QMFD (FIG. 1) work synchronously with the sampling and subsampling frequencies and produce continuous sample sequences of digital signals at their outputs.

Also the writing operations of subband sample in memory BF1 (FIG. 2), in its equivalent of block CHA2, and in memory BF3 are synchronous with the continuous flow of samples at their inputs. However, reading operations in said memories take place block by block; the length of said blocks (J samples) determines the frequency at which the two units of memories are mutually exchanged as well as the dimensions of the intervals into which the device operation is split.

Each interval consists of a coding and decoding phase which must take place while the units of said memories are filled with subsequent sample blocks. The alternance of the two phases is controlled by the logic level of the signal T/R whose period corresponds to a block of J samples.

During coding, sample blocks are read three times in the units of said memories.

The first reading involves blocks of subbands $X_1$, $X_2$ which are supplied to circuit CXH and its equivalent in block CHA2 to compute indices $h_{1ott}(J)$, $h_{2ott}(J)$ supplied on buses HT1, HT2 and identify vectors $a_{1hott}(i)$, $a_{2hott}(i)$ supplied on buses A1, A2.

The second reading allows calculation of residual signals $R_y(m)$ supplied on buses R1, R2, and supply of the samples of subband $X_3$ on bus R3. Hence the internal circuits of blocks CSS1, CSS2, CSS3 determine the two pairs of values $\partial_y(K)$ $s_y(K)$ supplied then on buses S1, ST1, S2, ST2, S3, ST3. Indices $s_y(K)$ identify on memories RM1, RM2, RM3, RM4 data supplied then through bus BLC to block QNT (FIG. 1) for addressing subband quantizers. It is worth noting that data on buses BLC, S, ST are updated at a frequency which is twice as high as that on buses A1, A2, being J=2K in the example of implementation described here.

The third reading allows to supply said subband samples through buses XD1, XD2, XD3 to block QNT (FIG. 3).

The first samples of the three blocks appear on said bus at the same time as corresponding coefficient vectors on buses A1, A2, and the first term of pairs on buses S1, ST1, S2, ST2, S3, ST3, in addition to the first set of data on bus BLC.

When on buses XD1, XD2, XD3 the (K+1)-th sample of the corresponding blocks appears, the second terms of pairs of values appears on buses S, ST and the second set of data appear on bus BLC.

For each terms of input subband samples, QNT circuits compute the corresponding terms of indices $e_y(m)$ supplied on buses ET1, ET2, ET3, using the data supplied through buses BLC, S, A by block PAR (FIG. 2); hence block MX7 (FIG. 3) supplies on bus ET the coding bits of the terms of samples.

The two terns of values present on bus ST, the two indices present on bus HT and the coding bits of the three blocks of J subband samples present on bus ET are supplied to block MPX (FIG. 1) which organizes them into a frame, and sends them onto output bus UT.

In the subsequent decoding phase, DMX (FIG. 1) supplies to the outputs the data relevant to blocks of J samples of the three subbands it receives from bus IR; on buses HR1, HR2 (FIG. 2) the indices allowing blocks CHA1, CHA2 to supply on buses A1, A2 the pair of coefficient vectors during decoding $a_{1ott}(i)$, $a_{2hott}(i)$; then, on buses SR1, SR2, SR3 it supplies the first of the two terns of indices during decoding $s_y(k)$ allowing blocks CSS1, CSS2, CSS3 to supply on buses S1, S2, S3 a first term of r.m.s. values $\partial_y(K)$, and memories RM1, RM2, RM3, RM4 to supply on bus BLC a first set of data for block QNT (FIG. 3).

Then DMX (FIG. 1) supplies on bus ER the terms of indices $e_y(m)$ relating to the first K samples of the three blocks, which are distributed on buses ER1, ER2, ER3 through block DX8 (FIG. 3).

QNT extracts the quantized values it presents then on buses N13, N23, N33, and hence the samples of reconstructed subband signal, it sends through buses XR1, XR2, XR3 to block QMFD (FIG. 1) which extracts therefrom samples of reconstructed digital speech signal supplied on bus UR.

After sending the K-th sample of the three blocks, DMX sends onto bus SR the second term of indices $s_y(K)$ replacing the first; a second term of r.m.s values $\partial_y(K)$ appears on buses S1,S2; S3 (FIG. 3) and a second set of data for block QNT (FIG. 3) appears on bus BLC.

Then DMX (FIG. 1) supplies on bus ER the terns of indices $e_y(m)$ relating to the second K samples of the three blocks, whereupon QNT (FIG. 3) extracts other samples of reconstructed subband signal it sends to block QMFD (FIG. 1).

At the end of these operations a new coding phase begins.

Modifications and variations are possible without going out of the scope of the invention.

More particularly for the embodiment of the variant of the above-described method, the following circuit mosifications are possible:

block PAR (FIG. 2) will comprise an additional circuit portion, for processing the samples of subband $X_4$ it receives from filter bank QMF OF FIG. 1, similar to that provided for the samples of subband $X_3$ (blocks BF3, CSS3); besides, memories RM1, RM2, RM3, RM4 will have a greater capacity necessary to contain four sets of data relevant to the four subbands; buses ST, SR, BLC will also comprise data words relevant to the fourth subband;

block QNT (FIG. 3) will comprise an additional circuit portion, always for processing the samples of subband $X_4$ it receives delayed by the additional buffer provided in block PAR (FIG. 2), similar to that provided for the samples of subband $X_3$ (block DV3, ML3, QUA3); multiplexer MX7 and demultiplexer DX8 will also comprise a portion relevant to indices $e_4(n)$ of the fourth subband also present on buses ET, ER;

multiplexer MPX and demultiplexer DMX (FIG. 1) will have now to process the information relevant to all the four subbands, while filter bank QMFD will also receive the samples of the reconstructed signal of the fourth subband from block QNT.

We claim:

1. A method of speech signal coding and decoding, comprising the following steps for coding:
   (a) converting a speech signal into a digital form and filtering the digital form of the speech signal by pairs of cascaded digital filters having specular transfer functions with respect to their transition frequencies to split said digital form of the speech signal into the subbands;
   (b) subdividing the samples of a first of said subbands, at lowest frequencies of said subband into a first sequence of blocks of J samples and subjecting the blocks to a linear prediction inverse filtering operation with vector quantization techniques, and selecting for each block, from a codebook of quantized filter coefficient vectors $a_{1h}(i)$, a vector $a_{1hott}(i)$ having index $h_{1hott}(J)$ and forming the optimal filter thus obtaining samples of residual signal $R_1(m)$, m being the progressive sample index;
   (c) splitting the samples of residual signal $R_1(m)$ into a second sequence of blocks of K samples (with K submultiple J), and computing for each block a quantized r.m.s. value $\gamma_1(K)$ by choosing from a quantizer a level of index $s_1(K)$;
   (d) extracting from said first subband samples, samples of normalized residual $EN_1(m)$, each being quantized by choosing a level of index $e_1(m)$ in a quantizer of a set of quantizers of the first subband having a different number of levels, said normalized residual being obtained by dividing by said quantized r.m.s. values $\gamma_1(K)$ a residual signal obtained by subtracting from said signal of the first subband a predicted signal $P_1(m-1)$ obtained by submitting said quantized normalized residual, previously multiplied again by said quantized r.m.s. value $\gamma_1(K)$, to a linear prediction filtering operation by using said vector of filter coefficients $a_{1hott}(i)$ forming the optimal filter;
   (e) subjecting samples of a second subband adjacent to the first subband the operations of steps (b) to (d), thus obtaining vectors of quantized coefficients $a_{2hott}(i)$ having index $h_{2ott}(J)$, quantized r.m.s. values $\gamma_2(K)$ having index $s_2(K)$, and samples of quantized normalized residual having index $e_2(m)$;
   (f) splitting samples of a third subband adjacent to the second subband into said second sequence of blocks and computing for each block a quantized r.m.s. value $\gamma_3(K)$ by choosing in a quantizer a level of index $s_3(K)$, each sample of the third subband being then divided by said quantized r.m.s. value $\gamma_3(K)$ obtaining a normalized value $EN_3(m)$ which is quantized by choosing a level of index $e_3(m)$ in a quantizer out of a set of quantizers of the third subband having different number of levels;
   (g) computing the minimum of a mean total distortion function using each term of quantized r.m.s. values $\gamma_1(K)$, $\gamma_2(K)$, $\gamma_3(K)$, said distortion being introduced with the quantization of subband samples, said function depending on the number of bits used to quantize subband signals, said minimum supplying terms of a number of levels choosing the quantizers out of said sets of subband quantizers;
   wherein said level indices $e_1(m)$, $e_2(m)$, said indices $h_{1ott}(J)$, $h_{2ott}(J)$ of linear-prediction optimal filter coefficient vectors, and said indices $s_1(K)$, $s_2(K)$, $s_3(K)$ of quantized r.m.s. values form the speech signal coding;
   the method also comprising the following steps for decoding:
   (h) using level indices $s_1(K)$, $s_2(K)$, $s_3(K)$ obtained during coding to identify in the corresponding quantizers the terms of quantized r.m.s. values $\gamma_1(K)$, $\gamma_2(K)$, $\gamma_3(K)$ and computing the terms of numbers of levels choosing the quantizers in said sets of subband quantizers;
   (i) detecting with level indices $e_1(m)$, $e_2(m)$, $e_3(m)$ obtained during coding, in the chosen subband quantizers, quantized normalized values $EN_1(m)$, $EN_2(m)$, $EN_3(m)$;
   (j) multiplying quantized normalized values $EN_1(m)$, $EN_2(m)$ by said quantized r.m.s. values $\gamma_1(K)$, $\gamma_2(K)$ and subjecting the result to a linear prediction filtering operation by using quantized filter coefficient vectors $a_{1hott}(i)$, $a_{2hott}(i)$, chosen in respective codebooks by said indices $h_{1ott}(J)$, $h_{2ott}(J)$ obtained during coding, and obtaining reconstructed signal samples of the first and second subbands;
   (k) multiplying quantized normalized values $EN_3(m)$ by quantized r.m.s. values $\gamma_3(K)$ obtaining samples of the reconstructed signal of the third subband; and
   (l) subjecting said reconstructed signals of the first, second and third subbands to an inverse filtering operation with respect to that used during coding to obtain the reconstructed speech signal.

2. The method defined in claim 1 wherein the subband splitting in step gives rise to a fourth subband, at the highest speech-signal frequencies which is formed as a null signal during coding and decoding.

3. The method defined in claim 2 wherein the subband splitting in step (a) gives rise to a fourth subband, at the highest speech-signal frequencies, said method comprising the further steps during coding of:

(m) subjecting samples of said fourth subband to step (f) as applied to said third subband, thereby obtaining quantized r.m.s. values $\gamma_4(K)$ of index $s_4(K)$, and samples of a quantized normalized value of index $e_4(m)$; and (n) in step (g) computing said minimum of the mean total distortion function also on the basis of said quantized r.m.s. values $\gamma_4(K)$, thus obtaining four sets of numbers of levels to select the quantizers out of the sets of quantizers of the four subbands;

said indices $e_4(m)$ of quantized normalized value, and said indices $s_4(K)$ of quantized r.m.s. value contributing to said speech-signal coding, said method comprising the further steps during decoding of:

(o) identifying said indices $s_4(K)$ obtained during coding, in the corresponding quantizer, quantized r.m.s. values $\gamma_4(K)$ cooperating in determining, as in the coding phase, the four sets of numbers of levels choosing the quantizers in said sets of quantizers of the four subbands; and (p) identifying said indices $e_4(m)$ obtained during coding, in the chosen subband quantizer, quantized normalized values of the fourth subband which are multiplied by said quantized r.m.s. values $\gamma_4(K)$ to obtain samples of reconstructed signal of fourth subband which are subjected to said inverse filtering to obtain said reconstructed speech-signal.

4. The method defined in claim 2 wherein to generate said sets of subband quantizers the following steps are provided:

(A) expecting from a speech-signal training sequence, sequences of subband samples and corresponding coefficient vectors $a_{1hott}(i)$, $a_{2hott}(i)$ forming optimal linear predication filters;

(B) initializing subband quantizer levels by optimal values for a Laplacian distribution speech-signal with unit variance and null mean value;

(C) effecting for each quantizer of the sets relating to the first and second subbands the following steps:

(C1) extracting from the sequence of samples of the corresponding subband, said normalized residual signal samples $EN_1(m)$ or $EN_2(m)$, by using said vectors $a_{1hott}(i)$ or $a_{2hott}(i)$ obtained in step (A);

(C2) splitting samples $En_1(m)$ or $EN_2(m)$ extracted in step (C1) into a number of subsets equal to the number of levels of the quantizer to be generated, grouping into each subset the samples having a minimum distance from the same quantizer level;

(C3) computing the centroids of each subset to serve as new quantizer levels; and (C4) repeat steps (C2), (C3) for a determined number of times;

(D) effecting for each quantizer of the sets relating the third and fourth subbands the steps of:

(D1) extracting from the sequence of samples of the corresponding subband there are extracted said samples of normalized values split into a number of subsets equal to the number of levels of the quantizer, grouping in each subset the samples having a mininum distance from the same quantizer level; and (D2) computing the centroids of each subset of step (D1) as quantizer levels.

5. A speech-signal coding and decoding device comprising:

a first bank of digital filters (QMF1) organized in cascaded pairs, the filters of the pairs having specular transfer functions with respect to transition frequencies, said bank splitting into subbands the digital speech signal to be coded;

a first circuit (CHA1) which during coding receives the samples of a first subband, at the lowest frequencies, from said first bank (QMF) and reemits them delayed to the output, and comprises means (BF1, IND1) to subdivide samples into blocks of J samples, which form a frame time, linear prediction inverse filtering and vector quantization means (LPCF1, CXH, VOCA) to obtain, from each block, residual samples of first subband $R_1(m)$, m being the progressive sample index, a first vector index $h_{1ott}(J)$ and a corresponding first vector of quantized coefficients $a_{1hott}(i)$ of the optimal filter during coding; said first circuit (CHA1) receiving, for each block of J samples, a first index $h_{1ott}(J)$ of the optimal filter during decoding and determining a corresponding first vector of quantized coefficients $a_{1hott}(i)$ during decoding;

a second circuit (CHA2) which during coding receives from said first bank (QMF) the samples of a second subband adjacent to the first, and which for each block of J subband samples obtains samples of second subband residual $R_2(m)$, a second vector index $h_{2ott}(J)$ and a second quantized coefficients vector $a_{2hott}(i)$ of the optical filter during coding, the second circuit (CHA2) receiving a second vector index $h_{2ott}(i)$ of the optimal filter and determining a corresponding second vector of quantized coefficients $a_{2hott}(i)$ during decoding;

first memory means (BF3) to temporarily store and subdivide into blocks the samples of a third subband adjacent to the second;

a third circuit (CSS1) which during coding calculates an r.m.s. value of blocks of K samples of said first subband residual $R_1(m)$, quantizes them obtaining for each block of K samples a first quantized r.m.s. value $\partial_1(K)$ and a corresponding first index of quantization level $s_1(K)$ during coding, and receives a first index of quantization level $s_1(K)$ and determines a first quantized r.m.s. value $\partial_1(K)$ during decoding;

a fourth circuit (CSS2) which obtains from said second subband residual $R_2(m)$ a second quantized r.m.s. value $\partial_2(K)$ and a corresponding second index of quantization level $s_2(K)$ during coding, and receives a second index of quantization level $s_2(K)$ and determines a second quantized r.m.s. value $\partial_2(K)$ during decoding;

a fifth circuit (CSS3), similar in structure to said third which obtains from each block of K samples received from said first memory means (BF3) a third quantized r.m.s. value $\partial_3(K)$ and a third index of quantization level $s_3(K)$ during coding, and receives a third index of quantization level $s_3(K)$ and determines a third quantized r.m.s. value $\partial_3(K)$ during decoding;

first decoding means (MX9, RM1, RM2, RM3, MR4) which receive said first $s_1(K)$, second $s_2(K)$, third $s_3(K)$ index of quantization level during coding and decoding and extract quantizer selecting signals (B1, B2, B3, L1, L2, L3);

a sixth circuit (PRB1) carrying out an adaptive linear prediction function on samples of the first subband it receives from said first circuit (CHA1), by using at every block of samples said first quantized coefficient vector $a_{1hott}(i)$ during coding and decoding, and samples of a first quantized normalized residual $\hat{E}N_1(m)$ during coding and decoding, and obtaining during coding samples of a first normalized residual $EN_1(m)$ with respect to said first quantized r.m.s. value $\partial_1(K)$ it receives from said third circuit (CSS1), and during decoding first-subband reconstructed-signal samples (XR1);

a seventh circuit (PRB2) receiving the samples of second subband and the second vector of quantized coefficients $a_{2hott}(i)$ from said second circuit (CHA2), said second quantized r.m.s. value $\partial_2(K)$ from said fourth circuit (CSS2), and samples of second quantized normalized residual signal $\hat{E}N_2(m)$ during coding and decoding, and obtains during coding the samples of a second normalized residual $\hat{E}N_2(m)$ and during decoding samples of second subband reconstructed signal (XR2);

an eighth circuit (QUA1) which, by using quantizers selected out of a set of first subband quantizers on the basis of said signals of selection of a quantizer it receives from said first decoding means, quantizes the samples of said first normalized residual $EN_1(m)$ it receives from said sixth circuit (PRB1) obtaining samples of said first quantized normalized residual $\hat{E}N_1(m)$ and indices of first subband quantization levels $e_1(m)$ during coding, and which obtains samples of said first quantized normalized residual $EN_1(m)$ during decoding on the basis of indices of first subband quantization levels $e_1(m)$ during decoding it receives at the input;

a ninth circuit (QUA2) receiving signals for selection a quantizer out of a set of second subband quantizers from said first decoding means, samples of said second normalized residual $EN_2(m)$ for said seventh circuit (PRB2), indices of second subband quantization levels $e_2(m)$ during decoding, and extracts samples of said second quantized normalized residual $EN_2(m)$ during coding and decoding supplied to said seventh circuit (PRB2), and second subband quantization-level indices $e_2(m)$ during coding;

a tenth circuit (QUA3) receiving selecting signals of a quantizer a third-subband quantizer set from said first decoding means, samples of a normalized value $EN_3(m)$ obtained by a divider (DV3) of the samples of the third subband (XD3), received from said first memory means (BF3), by said third quantized r.m.s. value $\partial_3(K)$ during coding, indices of third subband quantization levels $e_3(m)$ during decoding, and extracts third subband quantization level indices $e_3(m)$ during coding, and samples of a quantized normalized value $\hat{E}N_3(m)$ which are multiplied in a first multiplie (ML3) by said third quantized r.m.s. value $\partial_3(K)$ during decoding obtaining samples of third subband reconstructed signal (XR3);

a first multiplexer (MPX) combining in subsequent frames said first $h_{1ott}(J)$ and second $h_{2ott}(J)$ vector index during coding it receives from said first and second circuits (CHA1, CHA2), said first $s_1(K)$, second $s_2(K)$ and third $e_3(K)$ quantization level indices during coding it receives from said third, fourth and fifth circuits (CSS1, CSS2, CSS3), said quantization level indices of first $e_1(m)$, second $e_2(m)$ and third $e_3(m)$ subband during coding it receives from said eighth, ninth and tenth circuit (QUA1, QUA2, QUA3), relating to subsequent blocks of J subband samples, and sends each frame to the output (UT) as a coded speech signal;

a first demultiplexer (DMX) which receives and splits coded speech signal frames, and generates said first $h_{1ott}(J)$ and second $h_{2ott}(J)$ vector indices during decoding for said first and second circuits (CHA1, CHA2), said first $s_1(K)$, second $s_2(K)$ and third $s_3(K)$ quantization level index during decoding for said third, fourth and fifth circuits (CSS1, CSS2, CSS3), said quantization level indices of first $e_1(m)$, second $e_2(m)$ and third $e_3(m)$ subband during decoding for said eigth, ninth, and tenth circuits (QUA1, QUA2, QUA3); and a second bank of digital filters (QMFD), structurally inverse to said first bank of digital filters (QMF), which receives from said sixth (PRB1), seventh (PRB2) circuits and first multiplier (ML3) said samples of reconstructed signal of first, second and third subband (XR1, XR2, XR3) and generates a digital speech signal reconstructed during decoding.

6. The device defined in claim 5 which further comprises a time base (BT) generating synchronism signals for the circuits of the device and a first signal (T/R) whose logic level splits each frame time into a coding and decoding phase.

7. The devide defined in claim 6 wherein said first circuit (CHA1) comprises:

a first memory (BF1) temporarily storing subsequent blocks of J samples of first subband (X1);

a first counter (IND1) generating reading addresses of said first memory to sequentially read three times each block of samples during coding;

a circuit (CXH) computing an autocorrelation function of each block of samples of first subband it receives, though a first reading addressing of said first memory, said circuit determining said first vector index $h_{1ott}(J)$ during coding for each block of samples;

a second multiplexer (MX1) emitting at the output the first index $h_{1ott}(J)$ in coding or that in decoding, applied to the inputs, on the basis of the logic level of said first signal (T/R);

a second memory (VOCA) storing a codebook of quantized coefficients $a_{1h}(i)$, which, addressed by the output of said second multiplexer (MX1), emits said first quantized coefficient vector $a_{1hott}(i)$ of the optimal filter in coding or in decoding;

a linear-prediction inverse digital filter (LPCF1) for said first subband samples it receives, during a second reading addressing of said first memory (BF1), said filter using the first vectors of quantized coefficients of the optimal filter in coding received from said second memory (VOCA), and generating said first subband residual samples $R_1(m)$; and a first delay element (D1) for said first vectors of quantized coefficients of the optimal filter in coding which reemits at the output (A1) synchronised with a third reading addressing of said first memory (BF2).

8. The device defined in claim 7 wherein said third circuit (CSS1) comprises:

a computing circuit (VEF1) of the r.m.s. value $\sigma_1(K)$ relevant to blocks of K samples of said first subband residual $R_1(m)$ it receives from said first circuit (CHA1) during coding phases;

a third memory (MQ1) containing the levels of a quantizer of said r.m.s. value $\sigma_1(K)$;

a second counter (CT1) which when computing said r.m.s. value $\sigma_1(K)$ generates reading addresses of said third memory (MQ1);

a third multiplexer (MX2) which, controlled by said first signal (T/R), emits as addresses toward said third memory (MQ1) the output of said second counter (CT1) or said first quantization level $s_1(K)$ in decoding;

a first comparator (CFR1) which during coding compares each r.m.s. value $\sigma_1(K)$ computed by the relevant circuit (VEF1) and all the levels read in said third memory (MQ1), and supplying at the output (25) the level originating the minimum difference, the address of said level emitted by said second counter (CT1) being said first quantization level index $s_1(K)$ during coding; and a fourth multiplexer (MX3) which, controlled by said first signal (T/R), supplies at the output (20) as a first quantized r.m.s. value $\partial_1(K)$ for the coding phase the output level (25) of said first comparator (CFR1), and for the decoding phases the output (24) of said third memory (MQ1);

a fourth memory (BF2) which temporarily stores said first quantization level index $s_1(K)$ and said first quantized r.m.s. value $\partial_1(K)$, during coding, and re-emits them synchronous with said third reading addressing of said first memory (BF1).

9. The device defined in claim 8 wherein said six circuit (PRB1) comprises:

a first adder (SM1) computing the difference between the first subband samples (XD1), it receives from said first memory (BF1) through said third reading addressing, and the samples of a predicted signal;

a first divider (DV1) of the output of said first adder by said first quantized r.m.s. value $\partial_1(K)$ supplied by said fourth memory (BF2), which obtains said samples of first normalized residual $EN_1(m)$ during coding;

a fifth multiplexer (MX4) which, controlled by said first signal (T/R), supplies at the output said samples of first normalized quantized residual $\hat{E}N_1(m)$ during coding or decoding it receives at the inputs;

a second multiplier (ML1) of the output of said fifth multiplexer (MX4) by said first quantized r.m.s. value $\partial_1(K)$ during coding or decoding;

a second adder (SM2) of the output of said second multiplier and of said predicted signal (P1), the output of said second adder being during decoding said first subband reconstructed signal (XR1); and a linear-prediction digital filter (LPCF2) which filters the samples emitted by said second adder (SM2) during coding and decoding using the first vectors of quantized coefficients of the optimal filter it receives during coding from said first delay element (D1), and during decoding from said second memory (VOCA), said filter obtaining the predicted signal (P1).

10. The device defined in claim 9 wherein said eighth circuit (QUA1) comprises:

a fifth memory (MQ2) which contains said set of first subband quantizers, and which at each reading during coding supplies in sequence all the levels of a quantizer of the set, and during decoding a quantizer level;

a third programmable counter (CT2) which, for each sample of said first normalized residual $EN_1(m)$ during coding progressively counts up to a level number (L1) of a quantizer of said set;

a third adder (SM3) of the output of said third counter (CT2) and a first level address (B1) of a quantizer of said set, the output (38) of said third adder being the reading address of said fifth memory (MQ2) during coding;

a fourth adder (SM4) of a first level address (B1) of a quantizer of said set and a first subband quantization level index $e_1(m)$ during decoding, the output (39) of said fourth adder being the reading address during decoding of said fifth memory (MQ2) which emits said first quantized normalized residual $\hat{E}N_1(m)$ during decoding, the outputs of said fourth or third adder being supplied at the address input of said fifth memory through a sixth multiplexer (MX5) controlled by said first signal (T/R), said first level addresses (B1) and number of levels (L1) forming said quantiser selecting signals; and a second comparator (CFR2) which during coding compares each sample of said first normalized residual $EN_1(m)$ it receives from said first divider (DV1) with all the levels of a quantizer read in said fifth memory (MQ2), supplying at the output (N12) the level originating the minimum difference, said level being said first quantized normalized residual $\hat{E}N_1(m)$ during coding, the index of said level emitted by said third counter (CT2) being said first subband quantization level index $e_1(m)$ during coding.

11. The device defined in claim 5 wherein each of said sets of quantizers of first, second and third subband consists of quantizers having a different number of levels corresponding to a different number of bits of the corresponding quantization level indices, and in that the sum of the number of bits of each tern of said quantization level indices of first, second, and third subband is constant.

12. The device defined in claim 11 wherein each quantization level index has a number of bits higher than zero.

13. The device defined in claim 12 wherein said first decoding means comprises:

a seventh multiplexer (MXP) which, controlled by said first signal (T/R), sends to the output (210) said first $s_1(K)$, second $s_2(K)$, third $s_3(K)$ quantization level indexes during coding or decoding applied to its inputs;

a sixth memory (RM1) containing, for each term of quantization level indices received from said seventh multiplexer as a reading address, a bit number configuration to be allotted to said quantization level indices of first, second and third subband;

a seventh memory (RM2) containing, for each configuration of bit numbers it receives from said sixth memory as a reading address, said addresses of a first quantization level (B1, B2, B3) of a quantizer of first, second and third subband, and an eighth memory (RM3) containing, for each configuration of bit numbers it receives from said sixth memory as a reading address, said numbers of levels (L1, L2, L3) of quantizers of first, second and third subband.

14. The device, defined in claim 5 wherein said first bank of digital filters (QMF) produces a fourth subband signal, at the highest speech-signal frequencies, which is transferred as a null signal to the inputs of said second bank of digital filters (QMFD).

15. The device defined in claim 5 wherein said first bank of digital filters (QMF) produces a fourth subband at the highest speech-signal frequencies, said device further comprising additional means for processing the samples of said fourth subband in a way similar to that of said third subband, so that to the inputs of said second bank of digital filters (QMFD) there are transferred reconstructed signal samples of the fourth subband.

* * * * *